May 22, 1956 J. W. RICHARDSON 2,746,761
HIGH LOW TRAILER AXLE MOUNTING
Filed Nov. 18, 1952 3 Sheets-Sheet 1
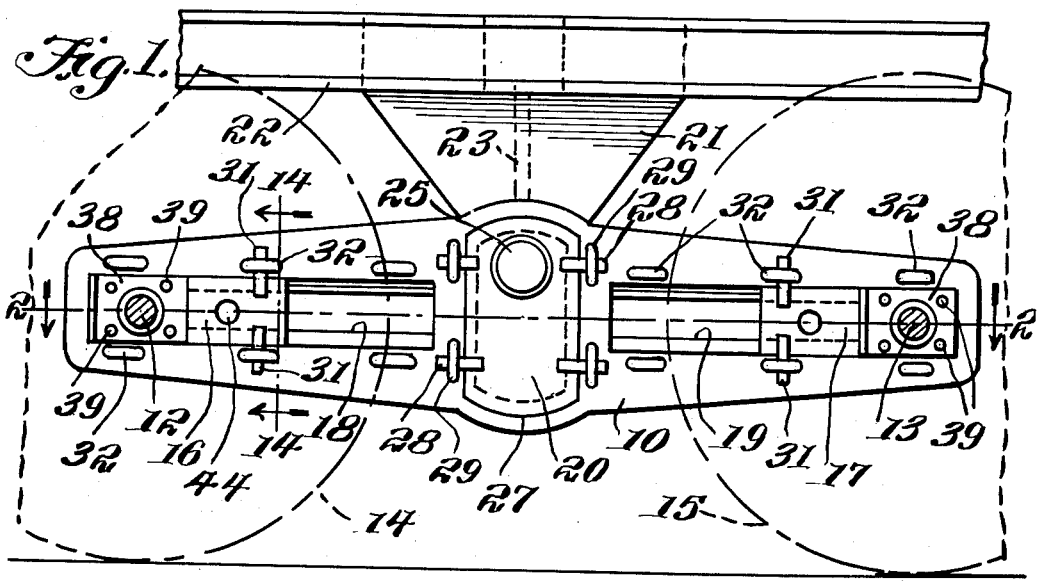
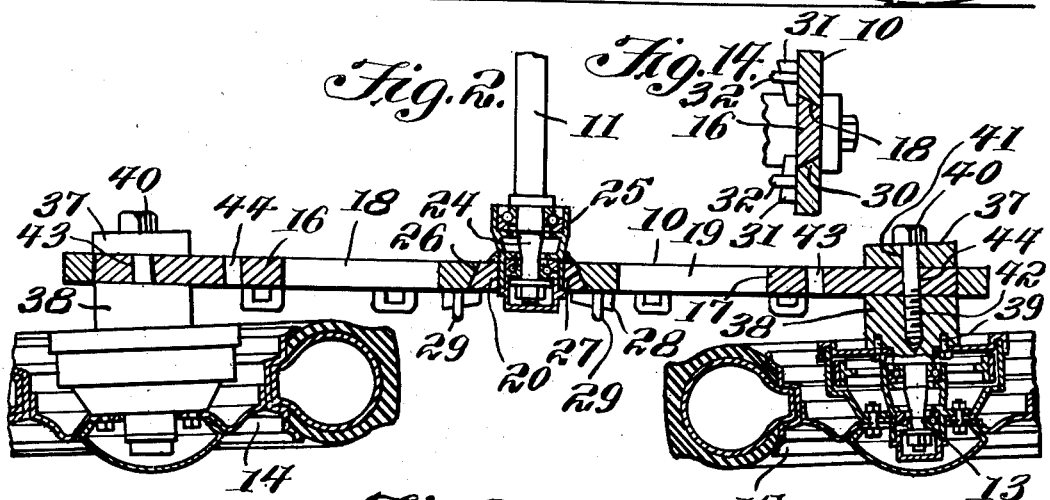
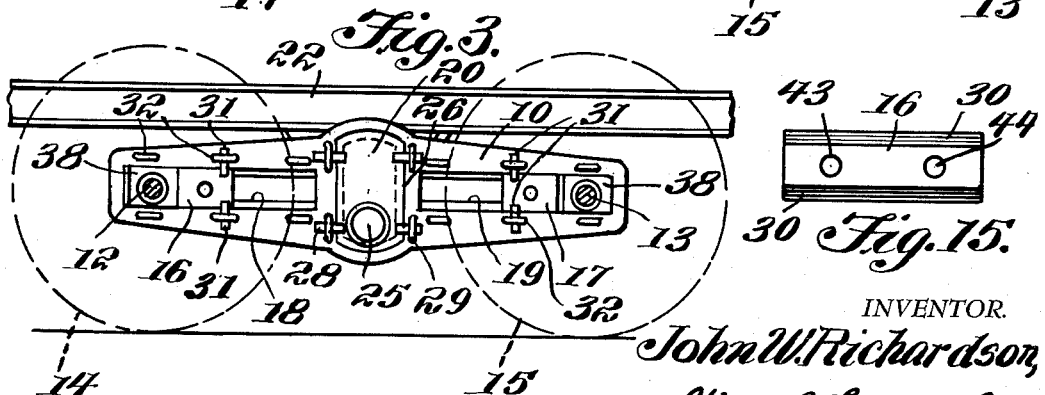
INVENTOR.
John W. Richardson
BY Victor J. Evans & Co.
ATTORNEYS

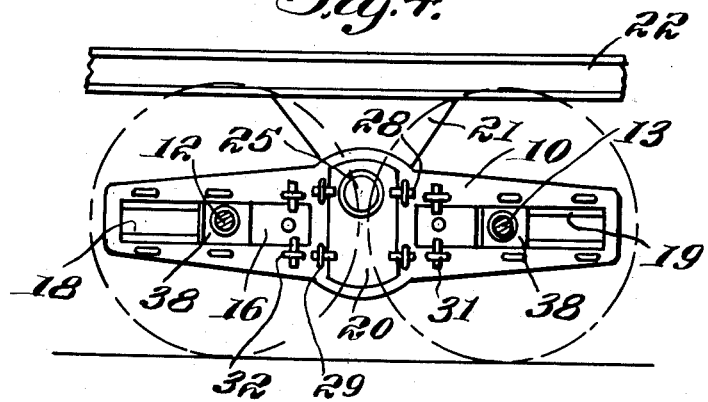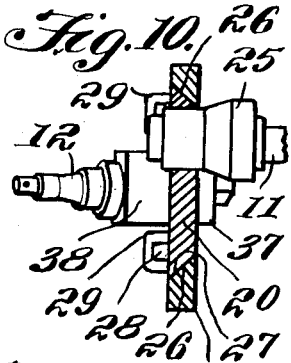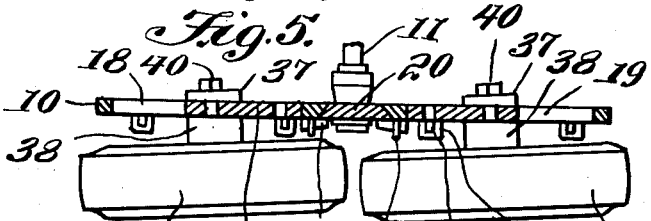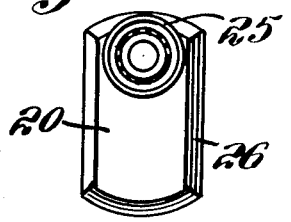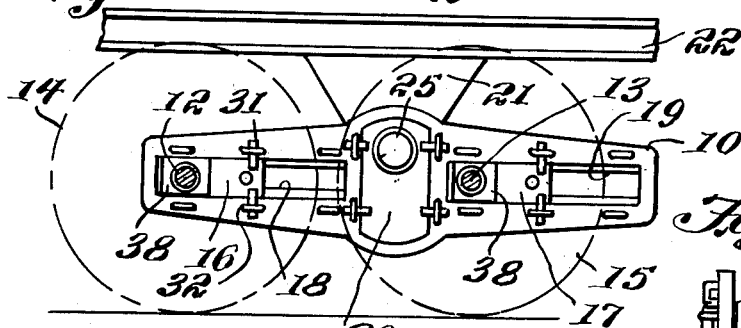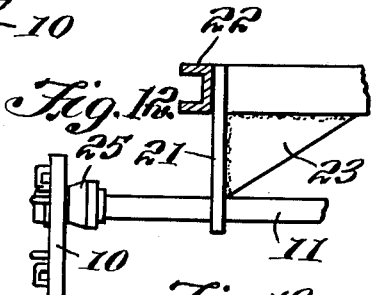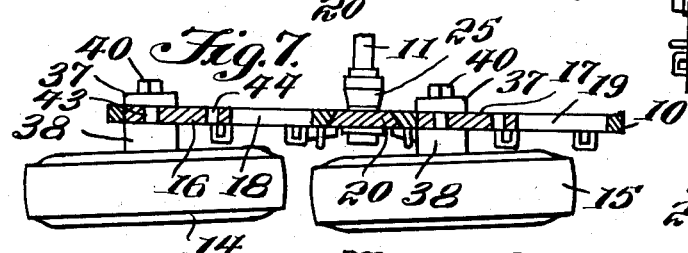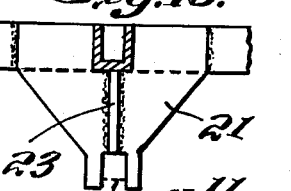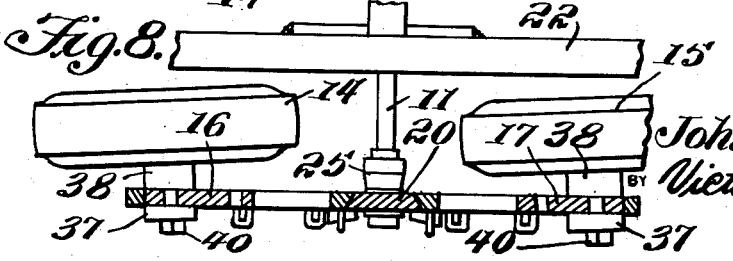

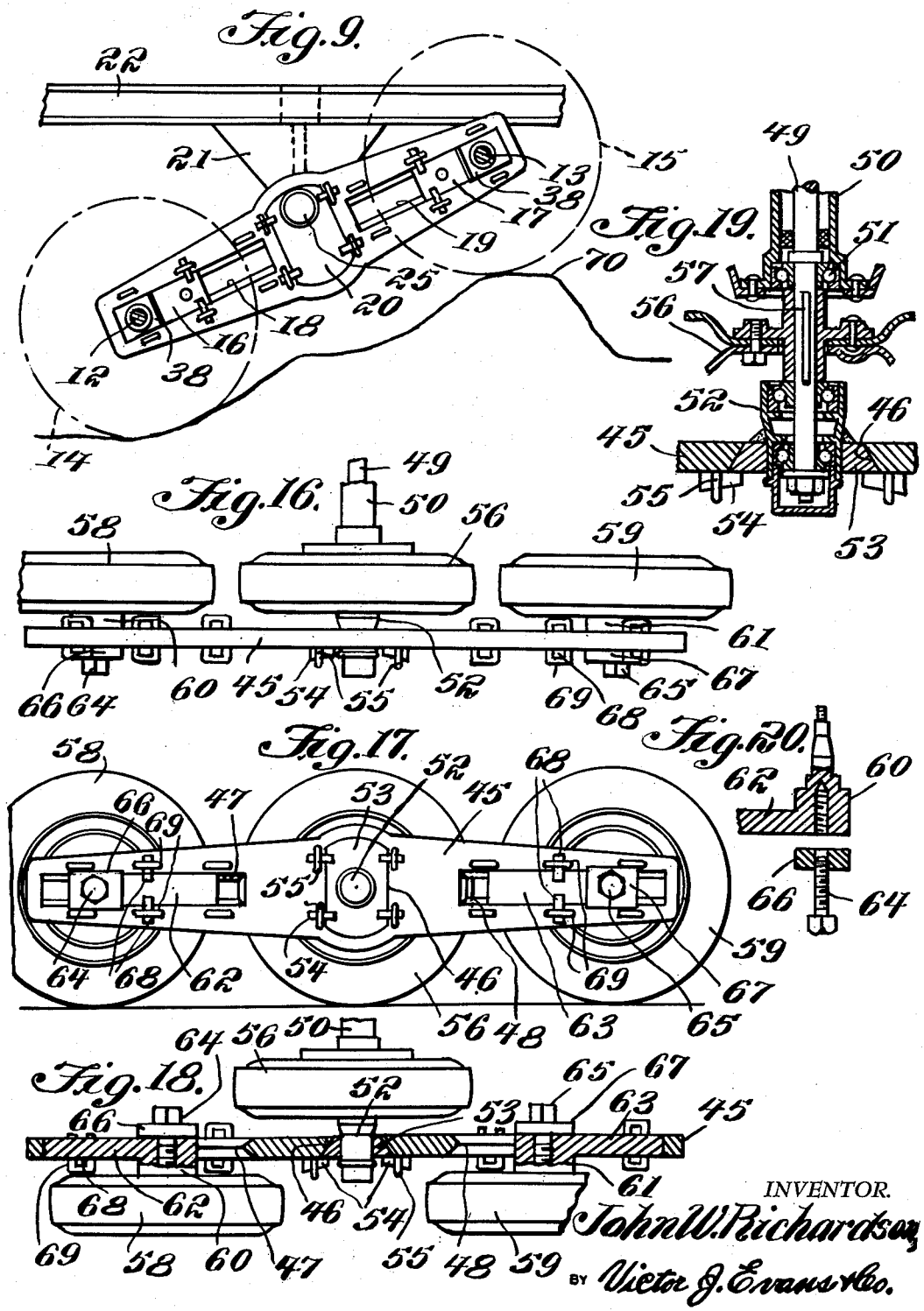

United States Patent Office 2,746,761
Patented May 22, 1956

2,746,761

HIGH LOW TRAILER AXLE MOUNTING

John W. Richardson, Houston, Tex.

Application November 18, 1952, Serial No. 321,204

6 Claims. (Cl. 280—104.5)

This invention relates to wheel mounting trucks for motor vehicle trucks and trailers, such a trucks of railway cars, and in particular jack-knife plates adjustably mounted on a stationary axle and having means for adjustably mounting wheels therein whereby with the plates pivotally mounted on the ends of an axle of a trailer the mounting plate with the wheels is free to rock to permit the wheels to crawl over a curbstone, log, or other obstruction.

The purpose of this invention is to provide an adjustable mounting for wheels of a trailer whereby the wheels are free to travel with a floating action over uneven surfaces and particularly in soft ground.

Various efforts have been made to use the floating action of railway car wheels on motor vehicle trucks and trailers, however, where two wheels are used with one following the other the axles of both wheels are fixed in relation to the chassis whereby as one wheel moves over an obstruction the other is suspended in the air. With the floating mounting wherein wheel mounting trucks or plates are pivotally mounted between the wheels, one wheel is free to move upwardly as the other moves downwardly whereby the wheels are free to travel over obstructions with a crawling action.

With this thought in mind this invention contemplates a floating wheel mounting including an elongated plate having a vertically disposed slot at the center with longitudinally disposed slots in the ends and with a reversible axle mounting plate in the slot at the center and with wheel spindles slidably mounted in the slots in the ends, the mounting plate may be turned through an angle of 180 degrees whereby the elevation of a chassis or trailer body on which the device is mounted may be raised or lowered.

The object of this invention is, therefore, to provide an improved wheel mounting plate in which wheels are adjustably mounted in elongated longitudinally disposed slots in the ends and in which the elevation of the center of the plate in relation to an axle upon which the plate is mounted is adjustable.

Another object of the invention is to provide a floating mounting for wheels of trailers and the like in which the wheels may be positioned in inclined vertical planes for toeing the wheels.

Another object of the invention is to provide a floating mounting for wheels of trailers and trucks in which a driving wheel may be used in combination with floating wheels positioned ahead of and to the rear of the driving wheel.

A further object of the invention is to provide a floating high low mounting for wheels of motor vehicles in which the mounting is of a simple and economical construction.

With these and other objects and advantages in view the invention embodies a stationary shaft mounted on supports depending from the chassis of a vehicle, elongated mounting plates pivotally mounted on said shaft with reversible mounting elements whereby the plates are adapted to be positioned in high and also in low positions in relation to the shafts, and wheel carrying spindles adjustably mounted in the mounting plates.

Other features and advantages of the invention will appear from the following description taken in connection with the drawings, wherein:

Figure 1 is a side elevational view showing the improved wheel mounting on the chassis of a trailer with parts of the wheels broken away.

Figure 2 is a sectional plan through the mounting plate shown in Fig. 1, the section being taken on line 2—2 of Fig. 1.

Figure 3 is a side elevational view similar to that shown in Fig. 1 with the mounting plate turned to an angle of 180 degrees wherein a trailer carried by the mounting is in a low position.

Figure 4 is a side elevational view similar to that shown in Fig. 1 with the wheels moved inwardly toward the center of the mounting.

Figure 5 is a sectional plan through the mounting plate with parts in the position shown in Fig. 4 and with the wheels toed.

Figure 6 is a side elevational view similar to that shown in Figs. 1 and 4 with one wheel positioned at the end of the mounting plate and the other toward the center of the mounting plate.

Figure 7 is a sectional plan through the mounting plate with the wheels in the position shown in Fig. 6.

Figure 8 is a sectional plan, similar to that shown in Fig. 7 with the wheels positioned on the inside of the mounting plate and with the wheels extended toward the ends of the plate.

Figure 9 is a side elevational view similar to that shown in Fig. 1 illustrating the position of the mounting plate with one of the wheels crawling over an obstruction.

Figure 10 is a cross section through the mounting plate taken at the center thereof and showing a shaft mounting with the shaft in the high position.

Figure 11 is a detail showing a side elevational view of the shaft mounting plate.

Figure 12 is a detail showing a section through one side of the trailer with the improved mounting plate pivotally mounted on the end of a shaft carried by brackets depending from the chassis of the trailer.

Figure 13 is a detail illustrating one of the shaft carrying brackets of the chassis of the trailer.

Figure 14 is a section taken on line 14—14 of Fig. 1 showing one of the wheel spindle mounting bars.

Figure 15 is a detail showing an elevational view of one of the wheel spindle mounting bars.

Figure 16 is a plan view of a mounting plate similar to that shown in Fig. 1, illustrating a modification wherein a driving wheel is used in combination with the wheel mounting and the driving wheel is mounted on an axle of a motor vehicle with the mounting plate carried by the suspended end of the axle.

Figure 17 is a side elevational view of the mounting shown in Fig. 16.

Figure 18 is a sectional plan through the mounting plate shown in Figs. 16 and 17.

Figure 19 is a sectional plan through one end of the driving axle of a vehicle in which the mounting plate is positioned on the end of the axle with the driving wheel on the inside of the mounting plate as illustrated in Fig. 16, and in which the parts are shown on an enlarged scale.

Figure 20 is a detail showing an exploded view of one of the wheel spindle mounting elements.

Referring now to the drawings wherein like reference characters denote corresponding parts the improved high low trailer wheel mounting of this invention includes a mounting plate 10, a stationary axle 11 on which the mounting plate is pivotally mounted, spindles 12 and 13 on which wheels 14 and 15 are journaled, respectively, bars 16 and 17 with which the spindles of the wheels are mounted in slots 18 and 19 of the plate 10 and a plate 20 with which the mounting plate 10 is pivotally mounted on the shaft 11.

The shaft 11, which is preferably square, is secured, preferably by welding in depending brackets 21 carried by a trailer chassis 22 and the brackets are supported with gusset plates 23.

The shaft 11 is formed with spindles 24 at the ends and hubs 25, which are journaled on the spindles of the shaft, as illustrated in Fig. 2, are secured in the reversible plate 20, as illustrated in Figs. 2 and 10. The plate 20, which is provided with beveled edges 26 is secured in an elongated vertically positioned opening 27 of the plate 10 with wedges 28 that extend through eyes 29 on the base of the plate 10. With the plate 10 mounted on the shaft 11 in this manner the plate 20 is adapted to be removed and reversed with the hub 25 positioned above the center of the mounting plate, as shown in Fig. 1 or below the center of the mounting plate, as shown in Fig. 3.

By the same means the bars 16 and 17, which are shown in detail in Fig. 15 and which are also provided with beveled edges as indicated by the numeral 30, are clamped in the slots 18 and 19 with wedges 31 in eyes 32. With the bars clamped in the slots with the wedges the bars are readily adjustable to suitable positions throughout the lengths of the slots and, consequently, the wheels may be positioned in the ends of the slots, as shown in Fig. 1 at intermediate points in the slots as shown in Fig. 4, or with one wheel in the extended end of one slot and the other at the center or inner end of the other slot as shown in Fig. 6.

The wheel mounting of this invention is provided with beveled washers 37 and 38 which are positioned on opposite sides of the bars 16 and 17 and the spindles 12 and 13 extend from outer surfaces of the beveled washers. The beveled washers are also provided with threaded openings 39 that are positioned to receive bolts for securing brake drums to the mountings with the drums positioned around the spindles. The washers 37 and 38 are also secured to the bars 16 and 17 with cap screws, such as the cap screws 40, shown in Fig. 2. The cap screws 40 extend through openings 41 in the washers 37 and are threaded in openings 42 in the washer 38. By adjusting the positions of the washers 37 and 38 the angle of the wheels in relation to the mounting plate 10 is adjustable whereby the toe-in of the wheels may be set to a suitable angle.

The bars 16 and 17 are provided with spaced openings 43 and 44 so that the bars may be turned over to facilitate adjusting the positions of the wheel spindles to opposite ends of the slots.

As illustrated in Fig. 8 the mounting elements of the wheels may be turned so that the wheels may be positioned on either the inside or outside of the mounting plates.

In the design illustrated in Figs. 16, 17, 18, and 20 a mounting plate 45, similar to the mounting plate 10, and which is provided with a vertically disposed center opening 46 and elongated slots 47 and 48 in the ends is mounted on an axle 49, such as the rear axle of a motor vehicle with the axle journaled in a housing 50 with bearings 51 and with the end of the shaft extended whereby a hub 52, similar to the hub 25, is journaled thereon. The hub 52 is mounted in a plate 53, similar to the plate 20 and the plate 53 is clamped in the opening 46 with wedges 54 that extend through eyes 55.

In this design the driving wheel 56 is mounted on the axle 49, the wheel being held in position with a key in a keyway 57.

With this type of mounting wheels 58 and 59, journaled on spindles having hubs 60 and 61, respectively, are mounted with bars 62 and 63 in the slots 47 and 48 with the wheels secured in the bars with cap screws 64 and 65 that extend through washers 66 and 67, respectively, and the bars are secured in the mounting plate 45 with wedges 68 that are held in eyes 69.

With this type of mounting the mounting bars are pivotally mounted on the wheel axles and the auxiliary wheels 58 and 59 are free to swing upwardly and downwardly as the wheels travel over uneven surfaces.

Figure 9 illustrates a typical application of the floating wheel mounting wherein the forward wheel 15 is traveling over an obstruction 70 without elevating the center of the axle on which the floating mounting is pivotally mounted.

The floating wheel mounting of this invention is particularly adapted for soft ground as with the use of two wheels the traction area is double, and when working on the side of a hill or on a grade the mounting plates on the low side of the vehicle may be positioned with the shaft in the upper side of the mounting plate or in the high position and the mounting plate on the opposite side may be turned to an angle of 180 degrees with the shaft in the low position.

With the wheels mounted in this manner the mounting plate is adapted to rotate through 360 degrees and with the device rotated through 180 degrees the positions of the wheels may be reversed whereby wear on the tire of a leading or following wheel may be reduced to a minimum.

Furthermore with the wheels arranged in this manner a brake may be provided on each wheel and with a jack-knife arrangement four wheels may be provided in a straight line.

The wheels may also be installed with the floating wheels on either the inside or outside of the driving wheel and both wheels may be set to positions at the ends of the mounting plates or moved toward the center to positions adjacent the center of the plate, as shown in Fig. 5 or one wheel may be extended to the end of the plate and the other positioned substantially at the center of the plate, as illustrated in Fig. 6.

It will be understood that other modifications, within the scope of the appended claims, may be made in the design and arrangement of the parts without departing from the spirit of the invention.

What is claimed is:

1. A floating wheel mounting comprising a mounting plate having a vertically disposed opening therein positioned midway of the length thereof and having elongated longitudinally positioned slots in the ends, bars having wheel carrying spindles extended therefrom positioned in the slots of the mounting plate, means securing said bars in the mounting plate, a plate having an opening spaced from one end reversibly mounted in the vertically disposed opening of said mounting plate, and means pivotally mounting said plate with the opening therethrough on a stationary shaft of a vehicle.

2. A high low wheel mounting for vehicles comprising a horizontally positioned elongated mounting plate having a vertically disposed opening midway of the ends thereof and having elongated longitudinally disposed slots in said ends, bars adjustably mounted in the slots in the ends of the mounting plate, wheel spindles adjustably mounted in said bars, means adjusting the angles of the bars in relation to the mounting plates for toeing-in wheels carried by the spindles, a plate having an opening spaced from one end adjustably mounted in the vertically disposed opening in the center of the mounting plate, said plate in the vertically disposed opening of the mounting plate being adapted to be mounted on a stationary shaft of a vehicle with the shaft extended through the opening spaced from one end of the plate.

3. In a floating wheel mounting, the combination which comprises an elongated horizontally positioned mounting plate having an opening in the center thereof with elongated longitudinally disposed slots in the ends, a plate positioned in the opening in the center of the mounting plate, bars positioned in the slots in the ends of the mounting plate, means clamping said plate and also the bars to the mounting plate, wheel spindles carried by and extended from said bars, a stationary axle for use on a vehicle, means pivotally mounting the plate in the opening at the center of the mounting plate on said axle.

4. In a floating wheel mounting, the combination which comprises an elongated horizontally positioned mounting plate having an opening in the center thereof with elongated longitudinally disposed slots in the ends, a plate positioned in the opening in the center of the mounting plate, bars positioned in slots in the ends of the mounting plate, means clamping said plate and also the bars to the mounting plate, wheel spindles carried by and extended from said bars, a stationary axle for use on a vehicle, and means pivotally mounting the plate in the opening at the center of the mounting plate on said axle, the positions of said wheel spindles being adjustable to position the wheels in vertical planes positioned at acute angles to said mounting plate.

5. In a floating wheel mounting, the combination which comprises a mounting plate having an opening therein positioned midway of the ends of the plate with elongated longitudinally disposed slots in said ends, a plate positioned in the opening midway between the ends of the mounting plate, a driving shaft journaled in said plate positioned in the opening of the mounting plate, a driving wheel mounted on said driving shaft, bars positioned in the elongated slots in the ends of the mounting plate, means clamping said bars to the mounting plate, and wheel spindles carried by said bars.

6. In a floating wheel mounting, the combination which comprises an elongated horizontally positioned mounting plate having a center opening positioned midway between the ends thereof therein and spindle mounting openings spaced inwardly from ends thereof, the center opening being extended upwardly above a plane extended through the spindle openings, means for mounting an axle in the center opening, wheel carrying spindles mounted in said spindle mounting openings, and means for adjusting the spindles longitudinally of said plate.

References Cited in the file of this patent

UNITED STATES PATENTS

| | | |
|---|---|---|
| 1,850,942 | Rockwell | Mar. 22, 1932 |
| 2,488,002 | Carraher | Nov. 15, 1949 |
| 2,501,579 | Pointer | Mar. 21, 1950 |
| 2,551,009 | Kaltenback | May 1, 1951 |